Feb. 8, 1927.
I. B. MYERS
1,616,700
LISTER CULTIVATOR HITCH
Filed Feb. 11, 1926   2 Sheets-Sheet 1
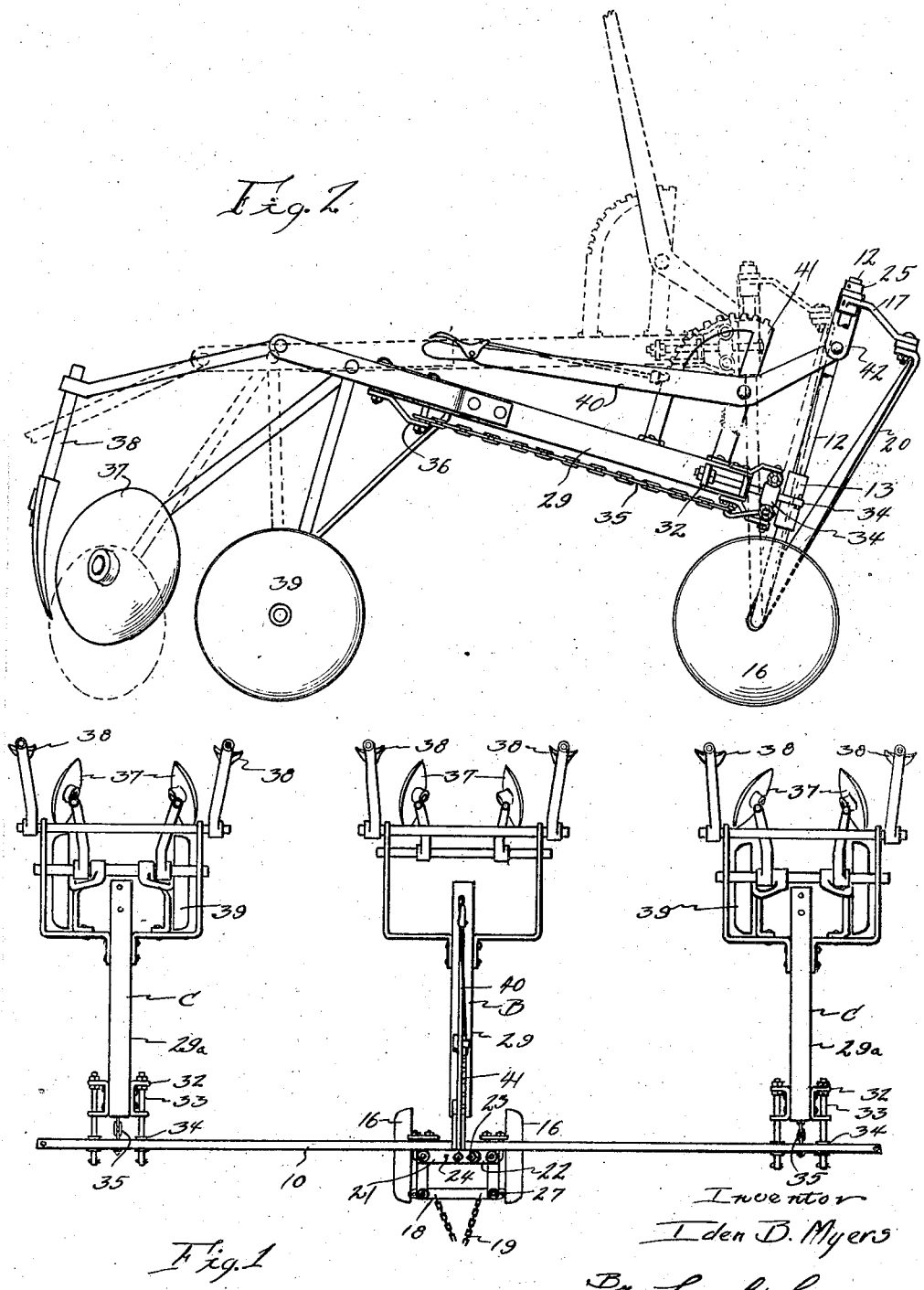

Feb. 8, 1927.
I. B. MYERS
1,616,700
LISTER CULTIVATOR HITCH
Filed Feb. 11, 1926     2 Sheets-Sheet 2
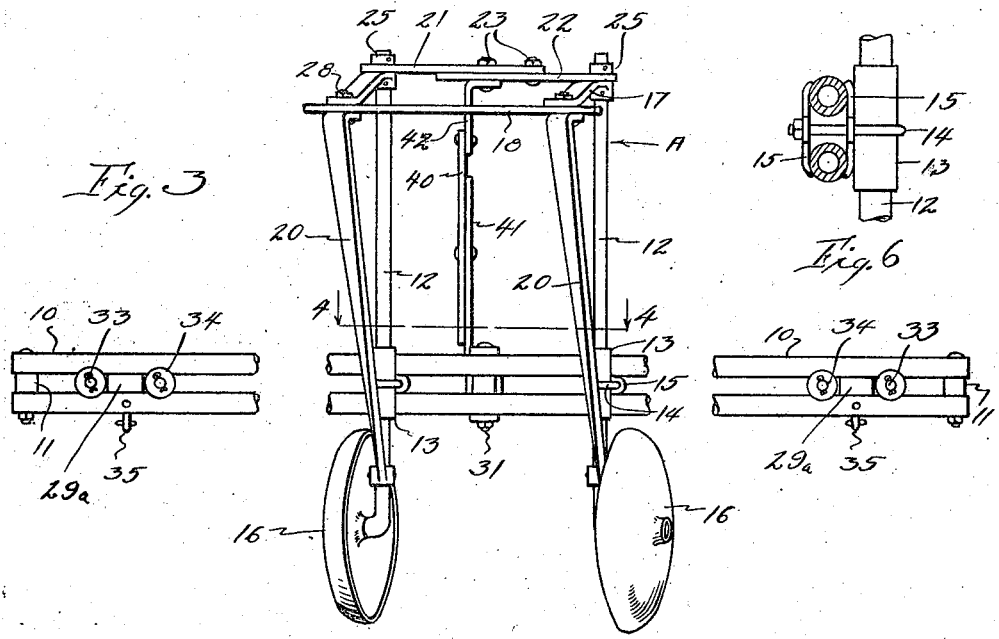
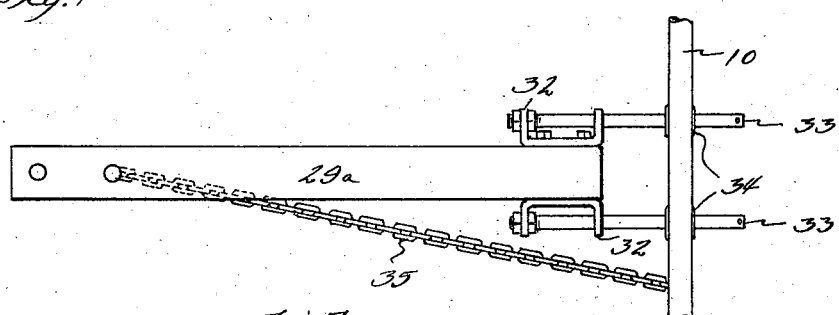
Inventor
Iden B. Myers
By Lynn H. Latta — Atty —

Patented Feb. 8, 1927.

1,616,700

UNITED STATES PATENT OFFICE.

IDEN B. MYERS, OF KIMBALL, SOUTH DAKOTA.

LISTER-CULTIVATOR HITCH.

Application filed February 11, 1926. Serial No. 87,546.

My invention relates to a lister cultivator hitch, and it is my object to provide in such a hitch a frame for connecting three or more individual cultivators, which is of simple, durable and inexpensive construction.

Another object of my invention is to provide such a hitch including a draft frame and cultivator frames, the outer of which are connected to the draft frame in such a manner that they may move transversely to the direction of travel of the cultivator without losing their parallel relation thereto.

A further object of the invention is to provide such a hitch having novel means for raising and lowering the cultivating tools.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Fig. 1 is a plan view of a complete cultivator embodying my hitch.

Fig. 2 is a side elevation of the same, the draft frame being shown in section.

Fig. 3 is a front view of the hitch, the cultivator implements not being shown.

Fig. 4 is a detail sectional view taken on the line 4—4 of Fig. 3.

Fig. 5 is a detail sectional view taken on the line 5—5 of Fig. 4.

Fig. 6 is a detail sectional view taken on the line 6—6 of Fig. 4.

Fig. 7 is an enlarged plan view of one of the cultivator tongues illustrating its connection with the draft frame.

One of the problems involved in providing a three-row cultivator is the mounting of the individual cultivators relative to the main draft frame in such a way that the operator will not find it difficult to steer all three of the cultivators independently. In solving this problem my invention involves a structure in which the outer lister cultivator frames can move transversely of the cultivated rows and retain their parallel relationship.

It will be understood that when the individual lister cultivator frames are maintained parallel with the rows which are being cultivated the disks will cut equally on either hill bordering the listed rows, and that even cultivation will thus be secured. When the frame is turned at an angle to the row one disk will be presented at a greater, and the other at a less, than normal angle to the hill.

The hitch includes the transverse draft frame, 10, which is formed of parallel rods or tubes connected at their ends, as at 11, in spaced relationship. A central forward truck, designated generally by the numeral A (see Fig. 3) supports the draft frame, 10.

The truck, A, is formed of the parallel shafts, 12, which are slidably and rotatably journaled in bushings, 13, secured by means of U-bolts, 14, and clamps, 15 (see Fig. 6) to the draft frame, 10. Upon the lower ends of the shafts, 12, are journaled wheels, 16, and to the upper ends are secured forwardly projecting arms, 17, which are connected to their forward ends by a cross arm, 18. To the cross arm, 18, may be secured draft chains, or the like, 19, which serve to hitch the cultivator to any source of draft power. (See Fig. 1). Braces, 20, are secured between the ends of the arms, 17, and the lower extremities of the shafts, 12.

An adjustable cross piece comprising the members, 21 and 22, connected by bolts, 23, which may be extended through any of several openings, 24, in the members, 21 and 22, connects the upper ends of the arms, 12. The cross piece is secured between collars, 25, and the arms, 17, and freely receives the shafts, 12, so as to allow them to rotate.

It will now be seen that as the draft upon the chains 19, varies in direction the arms, 17, will move correspondingly and cause the wheels, 16, to turn in the proper direction to follow.

The truck may be adjusted to fit different widths of rows by loosening the U-bolts, 14, and sliding the clamps, 15, on the frame, 10, by correspondingly shifting the arms, 21 and 22, longitudinally relative to each other and by adjusting the arm, 17, and the braces, 20, longitudinally of the cross arm, 18, which is provided with several openings, 27, to receive the pivot bolts, 28, for that purpose.

A central cultivator frame, B, (see Fig. 1) is pivoted to the frame, 10, midway of its ends. The cultivator frame comprises a stub tongue, 29, having at its forward end a clevis, 30, embracing the frame, 10, and pivoted thereto by means of a pin, 31.

The outer cultivator frames, C, each comprise the stub tongues, 29ª, which at their forward ends are provided with brackets, 32, in which are secured parallel forwardly projecting shafts, 33. Upon each of the shafts, 33, is journaled a roller, 34, received between the rods of the draft frame, 10.

The rollers, 34, are slidably and rotatably mounted on the shafts, 33, for a purpose which will hereinafter be more fully explained.

The draft chains, 35, are secured to the frame, 10, and near the rear ends of the stub tongues, 29ª, by means of clevises, 36.

Each of the cultivator frames, B and C, carry the usual lister disks, 37, and cultivator shovels, 38, and the frames, C, are provided with the truck wheels, 39. Thus it will be seen that the cultivator is supported at three points by the truck wheels, 16 and 39, the former being positioned forwardly of the frame and the latter, rearwardly.

Vertical tilting of the frame is accomplished by means of a lever, 40, pivoted to a sector, 41, which is secured to the central cultivator tongue, 29. The forward end of the lever is pivoted to a bracket, 42, depending from the cross brace of the truck, A. By lifting the lever, 40, the tongue, 29, will slide the frame, 10 upwardly. In so doing the sleeve 13 will slide upon the shafts 12. When the lever is moved to the position shown in Fig. 2 the entire frame will be moved upwardly and the cultivating implements, 37 and 38, will be moved toward the ground, the frame pivoting around the wheels, 39.

It will be understood that some means, either a foot pedal or hand lever, will be attached to each of the cultivator frames, C, in order that the operator may shift them laterally. Some such means for shifting is shown in Fig. 1, attached near the forward ends of the stub tongues, 29ª.

The central cultivator frame, B, is kept properly positioned in the row by the driving of the team or tractor which is pulling the cultivator. The two outer frames, C, must then be shifted laterally to follow the two adjoining rows.

The draft chains, 35, are secured to the cultivator frames very near the center of draft thereof, which allows the forward end of the tongues, 29ª, to be shifted laterally together with the rear portions of the frames, C.

As the frames, C, are moved laterally, the rollers, 34, will slide between the rods of the frame, 10, and will simultaneously slide longitudinally through the rollers, 34, in order to take care of the shortening of the distance between the frame, C, and the frame, 10, due to the swinging of the draft chain, 35, laterally.

By means of the connection described, between the draft frame and the cultivator frames, C, the latter frames are held against lateral tilting, while being free to move as described.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In a device of the class described, a transverse draft frame, a plurality of cultivator frames, each including a longitudinal stub tongue, laterally spaced, parallel, shafts projecting forwardly from said tongue, rollers on said shafts engaged with said draft frame so as to prevent vertical movement of the tongue at its forward end, relative to the draft frame, and to allow lateral movement of the tongue relative to said draft frame, and a draft chain secured to the tongue near the center of draft upon the cultivator frame, and to the draft frame.

2. In a device of the class described, a transverse draft frame, a plurality of cultivator frames, each including a longitudinal stub tongue, means connecting said stub tongues to the draft frame in such a manner as to prevent lateral tilting of the cultivator frames and to allow lateral movement of the forward ends of the tongues, and draft chains secured to the tongues near the centers of draft upon the cultivator frame, and to the draft frame.

3. In a device of the class described, a transverse draft frame including a pair of vertically spaced, parallel rods, a plurality of cultivator frames each including a stub tongue, a pair of horizontally spaced shafts, projecting forwardly from said tongue, rollers slidably and rotatably mounted on said shafts, said rollers being retained between the rods of the draft frame, and a draft chain secured to the tongue near the center of draft upon the cultivator frame, and to the draft frame.

4. In a device of the class described, a transverse draft frame, cultivator frames hitched to said draft frame near the ends thereof and having truck wheels spaced rearwardly of said draft frame, a central cultivator frame hitched to said draft frame intermediate its ends, a forward truck having wheels disposed substantially under the draft frame and intermediate its ends, said draft frame being mounted for vertical sliding movement relative to the forward truck, and means for varying the relative vertical positions of said draft frame and truck, to produce longitudinal tilting of the cultivator frames, said means comprising a lever fulcrumed on the central cultivator frame and pivoted to the forward truck.

5. In a device of the class described, a transverse draft frame, cultivator frames hitched to said draft frame near the ends thereof and having truck wheels spaced rearwardly of said draft frame, a central cultivator frame hitched to said draft frame intermediate its ends, a forward truck comprising laterally spaced, vertical shafts, sleeves secured to the draft frame and slidably receiving said shafts, wheels carried by said shafts, a cross brace connecting said shafts above the draft frame, and a lever fulcrumed on the central cultivator frame and pivoted to said cross brace, to produce longitudinal tilting of the cultivator frames.

6. In a device of the class described, a transverse draft frame, cultivator frames hitched to said draft frame near the ends thereof and having truck wheels spaced rearwardly of said draft frame, a central cultivator frame hitched to said draft frame intermediate its ends, a forward truck comprising laterally spaced, vertical shafts, sleeves secured to the draft frame adjustable longitudinally thereon and slidably receiving said shafts, wheels carried by said shafts, an extensible cross brace connecting said shafts above the draft frame, and a lever fulcrumed on the central cultivator frame and pivoted to said cross brace, to produce longitudinal tilting of the cultivator frames.

Signed at Kimball, in the county of Brule and State of South Dakota, this 4th day of February, 1926.

IDEN B. MYERS.